United States Patent [19]
Cabana

[11] Patent Number: 5,458,490
[45] Date of Patent: Oct. 17, 1995

[54] SIMULATED AMPHIBIOUS VEHICULAR ENVIRONMENTS "SAVE" SYSTEM TRAINER

[76] Inventor: Jacqueline Cabana, P.O. Box 1975, Oldsmar, Fla. 34677

[21] Appl. No.: 48,903

[22] Filed: Mar. 31, 1993

Related U.S. Application Data

[63] Continuation-in-part of Ser. No. 755,101, Sep. 5, 1991, Pat. No. 5,222,894.

[51] Int. Cl.$^6$ .................................................. G09B 9/06
[52] U.S. Cl. .............................................. 434/29; 434/60
[58] Field of Search ................ 434/29, 60; 114/258–261

[56] References Cited

U.S. PATENT DOCUMENTS

| | | | |
|---|---|---|---|
| 3,542,934 | 11/1990 | Warhurst et al. | 434/29 |
| 3,561,137 | 2/1971 | Guyan et al. | 434/29 |
| 3,596,375 | 8/1971 | Hervieu | 434/29 |
| 3,848,558 | 11/1974 | Henry | 114/261 X |
| 3,871,113 | 3/1975 | Crago et al. | 434/29 |
| 4,008,675 | 2/1977 | Johansson | 114/258 X |
| 4,026,038 | 5/1977 | Sunter et al. | 434/29 |
| 4,325,317 | 4/1982 | Wilford | 114/261 |
| 4,680,013 | 7/1987 | Boutras | 434/29 |
| 4,822,281 | 4/1989 | Zajicek | 434/29 |
| 4,854,876 | 8/1989 | Heath et al. | 434/29 |

FOREIGN PATENT DOCUMENTS

| | | | |
|---|---|---|---|
| 0822234 | 4/1981 | U.S.S.R. | 434/29 |
| 1636852 | 3/1991 | U.S.S.R. | 434/29 |

*Primary Examiner*—Richard J. Apley
*Assistant Examiner*—Glenn E. Richman

[57] ABSTRACT

The SAVE SYSTEM TRAINER provides a multi-purpose, multi-functional simulated vehicular environments for both singular unit or integrated joint preparedness training of Amphibious Crew and Marine Troop (Expeditionary Forces) consisting of "Crew and Troop Readiness", "Safety", "Mobilization", "Communication", and "Navigation" as pertains to expeditionary tactical launching, maneuvering, landing and recovery, full scale testing and training applications.

In addition, equal emphasis is given on expanding multiple functions of the SAVE SYSTEM TRAINER as a research, test, and development laboratory for the purpose of studying internal complexities of wet well transports and the effects caused by accelerated dynamic motion within this enclosed environment. Again, with a focus directed toward troop, crew, and equipment safety and efficiency in the most cost effective manner possible.

The SAVE SYSTEM TRAINER is designed to accommodate a wide variety of amphibious vehicles such as Amtracks, AAAV's, Hovercraft, LCU's, and LCM's (etc.) as well as internal/external systems training; and, a full scale aft transport flight deck and control tower for simulated joint training maneuvers between amphibious vehicles and CH-53 Sea Stallions, CH-46 Sea Knight's, AV-8B Harrier Jets, and MV-22A Ospreys (etc.). In addition, training systems and command centers will be housed on the trainer for each area of discipline.

The SAVE SYSTEM TRAINER provides long range benefits for both "O" Command capabilities and Tactical Training for all forms of Amphibious Vehicles and Expeditionary Forces. This transportable, multi-purpose flexible design will allow for 24 hour 7 day-a-week continuous air, land, and sea joint training which emphasizes both basic and adaptable skills while promoting speed, accuracy and team coordination.

15 Claims, 7 Drawing Sheets

SIMULATED AMPHIBIOUS VEHICULAR ENVIRONMENTS "SAVE" SYSTEM TRAINER

This application is a continuation-in-part of my earlier filed application, Ser. No. 07/755,101, filed Sep. 5, 1991, now U.S. Pat. No. 5,222,894.

TECHNICAL FIELD

This invention relates to methods and means for simulating amphibious vehicular environments as a unified multi-purpose, multi-function especially developed for training purposes.

BACKGROUND OF THE INVENTION

The SAVE SYSTEM TRAINER provides a multi-purpose, multi-functional simulated vehicular environments for both singular unit or integrated joint preparedness training of Amphibious Crew and Marine Troop (Expeditionary Forces) consisting of "Crew and Troop Readiness", "Safety", "Mobilization", "Communication", and "Navigation" as pertains to expeditionary tactical launching, maneuvering, landing and recovery, full scale testing and training applications.

In addition, equal emphasis is given on expanding multiple functions of the SAVE SYSTEM TRAINER as a research, test, and development laboratory for the purpose of studying internal complexities of wet well transports and the effects caused by accelerated dynamic motion within this enclosed environment. Again, with a focus directed toward troop, crew, and equipment safety and efficiency.

The SAVE SYSTEM TRAINER is designed to accommodate a wide variety of amphibious vehicles such as Amtracks, AAAV's, Hovercraft, LCU's, and LCM's (etc.) as well as internal/external systems training; and, a full scale transport flight deck and control tower for simulated joint training maneuvers between amphibious vehicles and CH-53 Sea Stallions, CH-46 Sea Knight's, AV-8B Harrier Jets, and MV-22A Ospreys (etc.). In addition, training systems and command centers will be housed on the trainer for each area of discipline.

The SAVE SYSTEM TRAINER provides long range benefits for both "O" Command capabilities and Tactical Training for all forms of Amphibious Vehicles and Expeditionary Forces. This transportable, multi-purpose flexible design will allow for 24 hour 7 day-a-week continuous air, land, and sea joint training which emphasizes both basic and adaptable skills while promoting speed, accuracy and team coordination.

This application in part discloses and claims subject matter disclosed in my earlier filed pending application, Ser. No. 755,101 filed 1991 which requires stationary mounting for both land and sea training and/or the use of an umbilical cord which is connected to an auxiliary power and control source; and, focused primarily on training amphibious vehicles.

Inventive contributions to seagoing situations have tended to concentrate upon simulating pitch and roll as in U.S. Pat. No. 3,561,137 to Guyon or U.S. Pat. No. 4,822,281 to Zajicek; or to simulating maneuvering and navigation, as in U.S. Pat. No. 3,596,375 to Hervieu. U.S. Pat. No. 3,871,113 to Crago and Emmerson, and U.S. Pat. No. 4,026.038 to Sunter and Prins; and to, flight navigation as in U.S. Pat. No. 4,347,055 to Geiger. More recent U.S. Pat. No. 4,986,204 to Yoshida for controlled oscillation; and U.S. Pat. No. 4,854,876 to Heath and Cole for an Aircraft Carrier Simulator and Method; and to, U.S. Pat. No. 4,926,773 to Manor for High Performance Sea-Going Craft exemplifies novel simulation of the difficult airborne to ship board transition.

The major disadvantage of the prior art is the trainer's inability to act as a self-contained full-scale free-float, multi-functional transport simulator for use in joint training maneuvers for the entire Naval-Marine Expeditionary Force with extended Over-the-Horizon training capabilities.

SUMMARY OF THE INVENTION

As government and defense priorities shift from bi-polar strategic defense to a more global strategy of dealing with diverse geographic and third world conflicts, there is a shift in focus to areas which have been previously neglected including Special Operations for Low Intensity Conflict (SOLIC), Special Warfare (SPECWAR), Mine Warfare (MW) and other areas including Amphibious Assault Warfare.

More recently, Operation Desert Storm dramatized the extreme risks and dangers in launching and recovering amphibious support vehicles in turbulent swells and war time conditions. This persistent danger could also be directed toward the important advance reconnaissance missions flown by today's multi-functional Marine Air Command.

A primary function of the present invention is to provide joint training for the Expeditionary Force as relates to and incorporates all necessary operational functions in simulating full scale, real time, hands-on-training while obtaining actual seagoing experience without the use of a commissioned vessel.

Another object of this invention is to provide aural, tactile, and visual cues characteristic of such seagoing environments relating to all training positions for the Expeditionary Force.

A further object of the invention is to provide both simulated shipboard and transitional waterborne-airborne joint amphibious training experience over extended distances from shore (OTH).

In general, the objects of the present invention are attained by means of a free floating transport housing simulating the full hull aft section for amphibious vehicle launch-and-recovery with full transport flight deck and control tower over-head for completely integrated airborne navigation, launch-and-recovery joint training maneuvers.

The preferred embodiment of the simulated transport contains all necessary functions relating to successful joint training maneuvers relating to: full scale amphibious crew and troop training—full scale airborne crew and troop training—classrooms, strategic tactical mission briefing and debriefing rooms, transport medical training facility, integrated storage compartments, built-in computer simulated training; and, self contained flight control tower which can be used as a training and testing facility for advanced radar scanning, radar surveillance, monitoring tactical vehicle effectiveness and safety, transmit communications that are resistant to interception and jamming for OTH distances; and, are exposed to aural, visual, and tactile cues consistent with seagoing sounds, sights, and movements while receiving instruction in procedures for all amphibious launching, maneuvering, landing, and recovery; and, as a flight test/training facility for Unmanned Air Vehicles (UAV's) launch and recovery test laboratory for advanced concepts and mission tactical orientation maneuvers for UAV's; and, as a Command, Control, and Support transportable facility for each Sea-Land-Air operation relating to real time simulated training of complex inter-relationship maneuvers between mobility support, landing support, fire power, intelligence and the Commander's Strategic Warfighting Tactical Missions.

In short, the SAVE SYSTEM TRAINER is designed to improve the safety and efficiency of all amphibious operations by means of incorporating greater cost efficient training methods in employing the "Expeditionary Forces".

DESCRIPTION OF THE INVENTION

Figure 1:
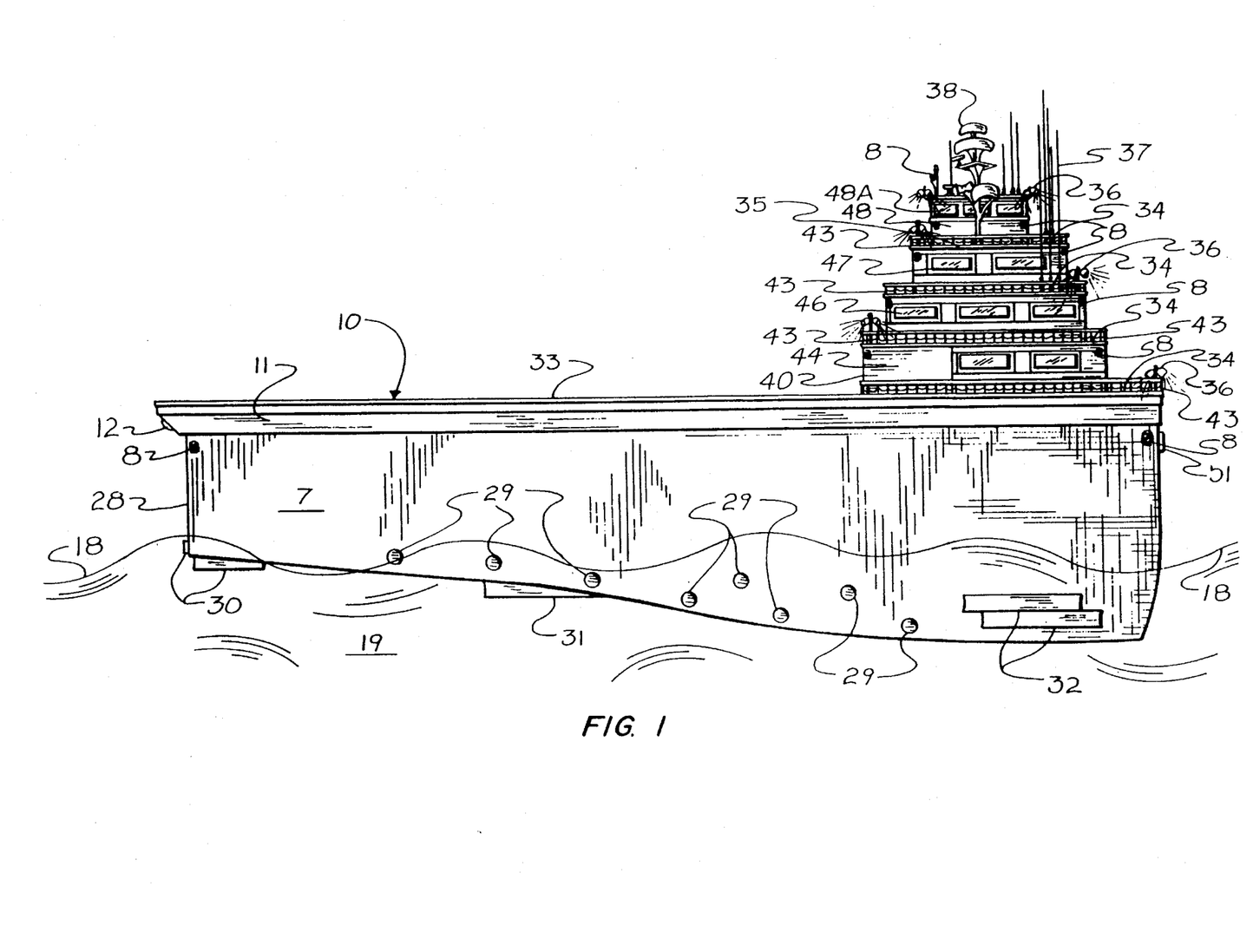
FIG. 1 is a standard side elevation of the simulator embodiment of the SAVE (Simulated Amphibious Vehicular Environments) System Trainer according to this invention.

FIG. 1 shows, simulator trainer embodiment having housing 10 simulating the aft portion of part of a transport ship containing a flight deck 33 for manned and unmanned air/land amphibious support vehicles on exterior horizontal surface and interior amphibious decks such as is conventionally used to carry air, land, sea amphibious crews and vehicles, as well as "C4" Command & Control personnel and material. The entire housing 10 is surrounded by a body of water 19 (see wavy surface line 18) and is totally independent of land connections.

Hull-simulating housing 10 is independently operational for multiple, joint, or individual training exercises and in a wide variety of simulated and controlled pitch and roll movements governed by strategically placed turbo-powered water jets 29, 30, 31, and 32 along the under belly and around all hull elevations. Each water jet has the ability to be computer controlled for joint training operations or independently controlled for specific simulations and desired weather conditions. Additionally, turbo-powered water jets 30, 31, and 32 positioned horizontally under and around the exterior hull surface allow for forward and backward (reverse) movement for increased pitch and roll simulation allowing for the added realism of forward and reverse transport movement.

The aft end shows the stern gate 28 in its natural raised stowed position with wind 12, rain 9, and fog 6 simulators being directed forward and downward from the far end projecting under the aft far end of flight desk 33. The forward end of flight deck contains a combination acoustical-fire safety wall 40. The horizontal space created by the wind-rain-fog simulators 12, 9, & 6 also houses an internal/external ventilation system 11 for all below deck and above deck enclosed areas.

Safety is stressed at all levels of virtual reality full scale simulated training with safety lights 8 mounted back-to-back at each exterior right angle intersection and combination search/flood lights 36 strategically mounted at all exterior observation levels.

Rising above flight deck amphibious housing 10 overhead is a multi-purpose "C4" Command, Control, Joint Operations Center 46 & 47, Training and Debriefing Areas 44, Joint Simulation Control Tower 48, Tactical and Reconnaissance Surveillance Test Equipment 37, Multiple Observation Decks 34 with safety rails 43, Equipment Evaluation and Testing platform areas 35 with complete radar tracking and joint communications tower 38 (as shown in more detail later).

The entire structural hull section 7 of the housing is windowless, as is the rest of housing 7 so as to isolate crews inside from the external environment in favor of the simulated internal environment presented to them according to this invention. Parts of the interior are visible in the next view.

Figure 2:
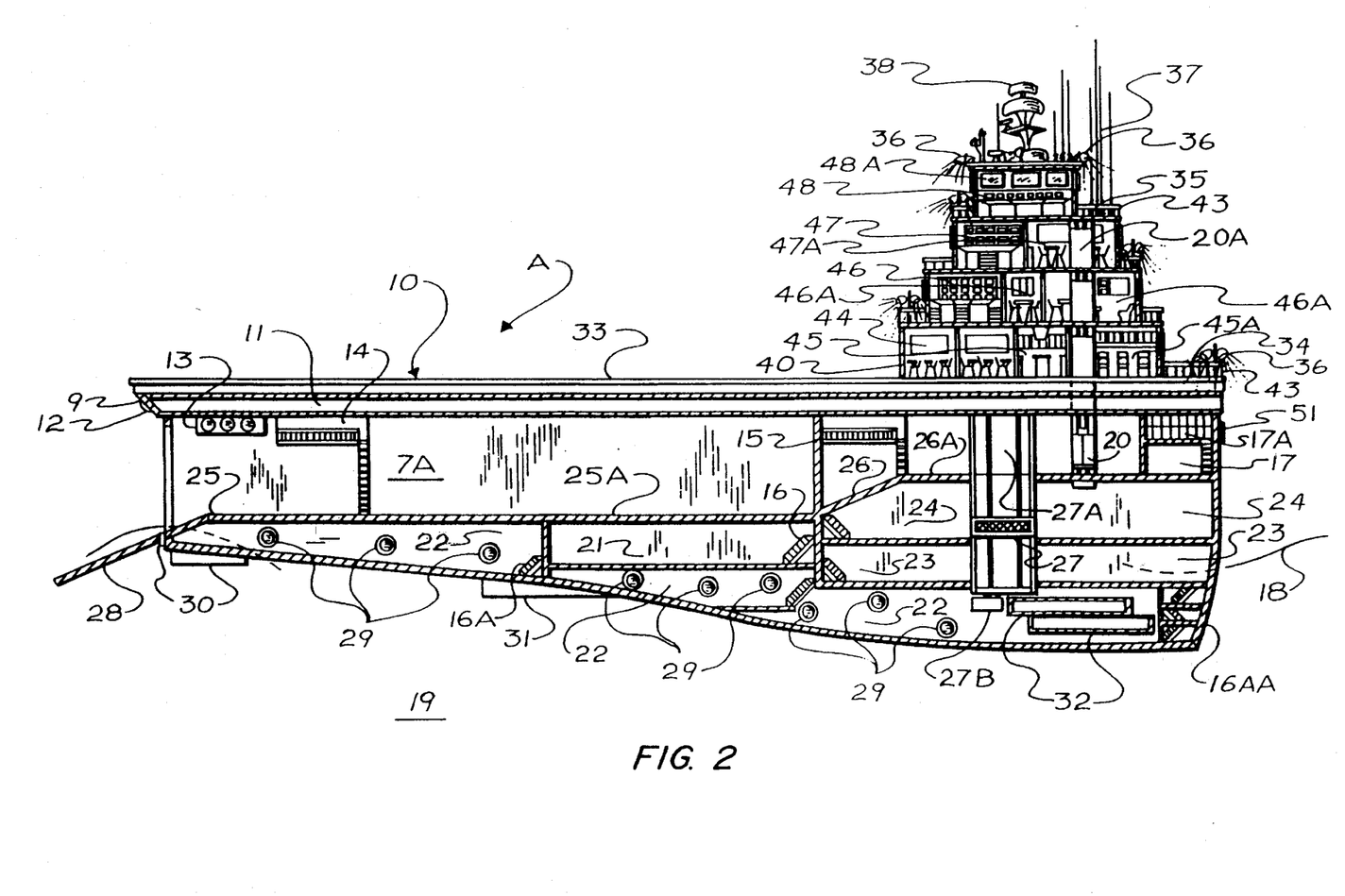
FIG. 2 is a longitudinal medial longitudinal sectional elevation of the same embodiment as in FIG. 1, reoriented to reveal interior features.

FIG. 2 shows embodiment 10A side view elevation reoriented so as to reveal a longitudinal medial sectional elevation. Here the stern gate 28 is shown deployed in its launch-and-recovery mode exposing launch-and-recovery landing deck 25 and revealing a trio of signal lights 13 (usually red, amber, and green) mounted over head deck section 25 near stern gate for use in controlling deployment of amphibious crew and vehicles. Adjacent to this bank of raised signal lights is the flagmen's station represented by an elevated platform containing an integrated control panel for all types of waterborne (amphibious vehicles) and airborne (amphibious hovercraft) respectively. The Flagmen control/display panel serves to govern interior signal lights 13, interior blackout control, stern gate 28 and/or launching ramp 26 deployment and stow control.

Additional testing/training flexibility has been added to the internal structural hull section 7A with the extended elongation of the launch-and-recovery deck 25A which can function as either a wet or dry well launch-and-recovery staging area. As a flooded wet well staging area for amphibious vehicles, the effects of accelerated dynamic wave motion creates an internal laboratory environmental to study and test the internal effects of oscillation and dynamic motion in direct relationship with each other in controlled, real time, full scale employment conditions.

Ramp 26 serves to connect 25A dry/wet well staging/test laboratory area with 26A raised dry well vehicle parking/storage area. To more closely simulate the internal mechanics of an amphibious transport ship, a vehicle elevator platform 27 in shaft 27A is used to lower or raise amphibious vehicles and supplies to lower storage decks 24 and 23. An internal access stair well 16, 16A, and 16AA functions to connect internal vehicle storage, supply, and mechanical decks 21, 22, 23, and 24 with each other.

All mechanical and electrical equipment, generators, power supplies, and turbo water jets 29 are housed in compartment 22 which lines the lower internal hull structure 7A. External turbo water jets 30, 31, and 32 are mounted directly to the under side of hull with mechanical access for parts repair recessed in mechanical compartment areas 22.

An internal training and observation platform 15 is positioned over ramp 26 to allow full 180° visual joint training tactical evaluation. Positioned directly at the farthest forward part of of deck level 26A is located a crew clear-up area 17 and personal locker 17A storage area.

To further simulate the internal structure of a transport ship for crew safety, speed, and effectiveness training, an internal elevator 20 with vertical shaft 20A serves to connect "C4" Command & Control 46 and 47, classroom 44, debriefing/rest and recovery areas 46A & 47A, and medical laboratory 45 & 45A training center with lower amphibious vehicle training deck 26A. The Command Control Tower for joint operations training is entered by a stair well (not shown in this elevation) from deck 47 to control tower 48. 360° wrap-around observation windows 48A in Joint Operations Control Tower offer immediate response and tactical evaluation.

Joint Command & Control operations centers 46, 47, and 48 feature completely integrated video monitors, computer simulations, communication networking, radar scanning and monitoring video screens 38, operations effectiveness and evaluation monitoring, Reconnaissance Surveillance Test Platform 35, Communications antennas 7, and Multiple Observation Decks 34.

Figure 3:
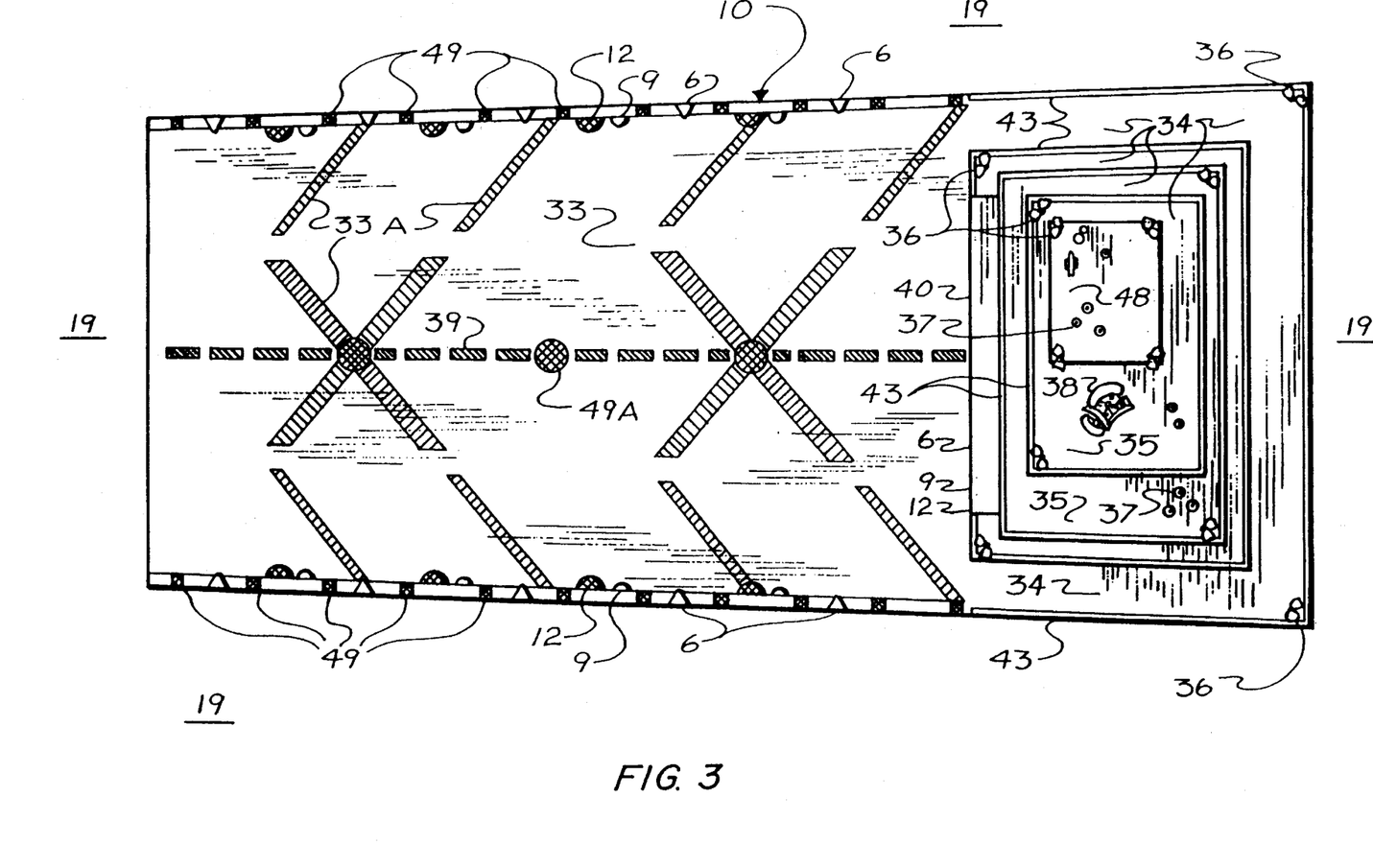
FIG. 3 is a plan view as viewed from the top looking downward of the simulator trainer embodiment of FIG. 1.

FIG. 3 shows the top view looking downward on simulator trainer embodiment 10 housing simulating the aft portion of a transport ship containing a full scale flight deck 33 for manned and unmanned air/land amphibious support vehicles and vertical housing over bow "C4" Command & Control personnel and material. The entire housing 10 is surrounded by a body of water 19 and is totally independent of land connections.

Lining the perimeter of the flight deck are safety lights 49, safety target markings 33A, and center line designation 39 with recessed pattern lights 49A. Dense fog and smoke 6 producing apparatus to simulate varied foul weather landing conditions are placed at alternate intervals around the flight deck perimeter in direct line and evenly spaced between perimeter safety lights 49. Additionally, rain nozzles 9 and wind blowers 12 are alternately set between flight deck safety lights 49 (as indicated). High powered wind 12, rain 9, smoke and fog 6 simulators are also installed over safety wall 40 and will be described in detail further on.

The top view of embodiment 10 bow section shows the placement of a multi-purpose "C4" Command, Control, Joint Operations Center; Joint Simulation Control Tower 48, Tactical and Reconnaissance Surveillance integrated communication antennas 37, Multiple Observation Decks 34 surrounded by safety rails 43, Equipment Evaluation and Testing designated areas 35 with complete radar tracking and joint communications tower 38, placement of safety/flood lights 36, and foul weather simulators 6, 9, and 12. (as shown in more detail later)

Figure 4:
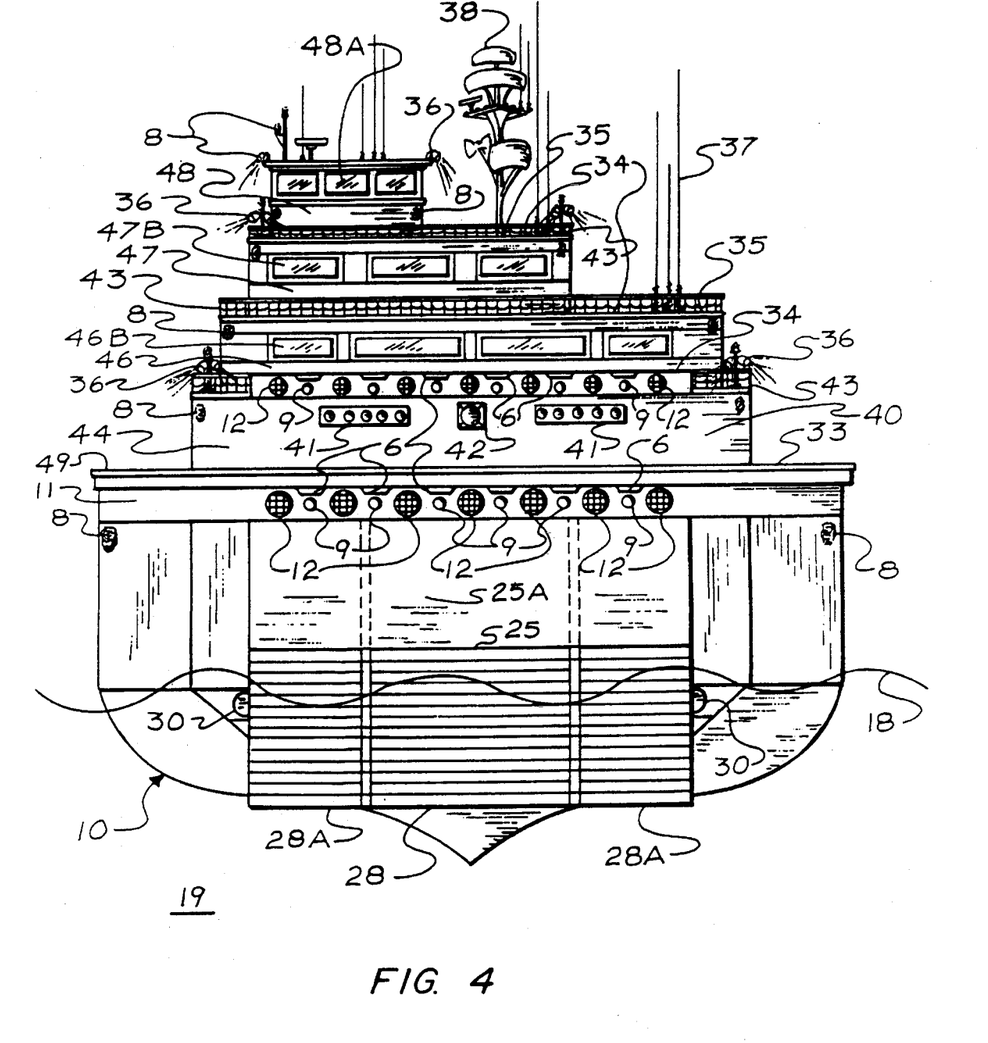
FIG. 4 is stern elevation showing both regular and alternative downward positioning of stern gate as shown in plan view in FIG. 2 of the trainer embodiment.

FIG. 4 shows the aft end of embodiment 10 and reveals intakes of wind 12, rain 9, and fog 6 simulators as positioned on two tiers. The first tier is projected forward over the stern gate sections 28 & 28A launch-and-recovery. The second tier is positioned over the vertical safety flight wall 40 and takes the place of the front, first tier observation deck 34 over housing 44. Twin banks of safety signal lights 41 are mounted on flight safety wall 40. Centered between them in junkster positioning on flight wall 40 is the beacon light designation for flight deck center line 42 which serves to direct incoming air units to center line 39 of flight deck 33.

The stern gate for launch-and-recovery of amphibious units is adjustable containing the main center section 28, with half-width wings 28A positioned on either side. When lowered in deployed position, ramp 28–28A reveals the internal launch-and recovery deck 25–25A. The extra width follows through the entire wet-dry well training area and is useful for launching watercraft that hover above the water surface instead of displacing water for their support—as amphibious craft have traditionally done. All additional features above and below housing 10 are as already described and are not mentioned further here.

Figure 5:
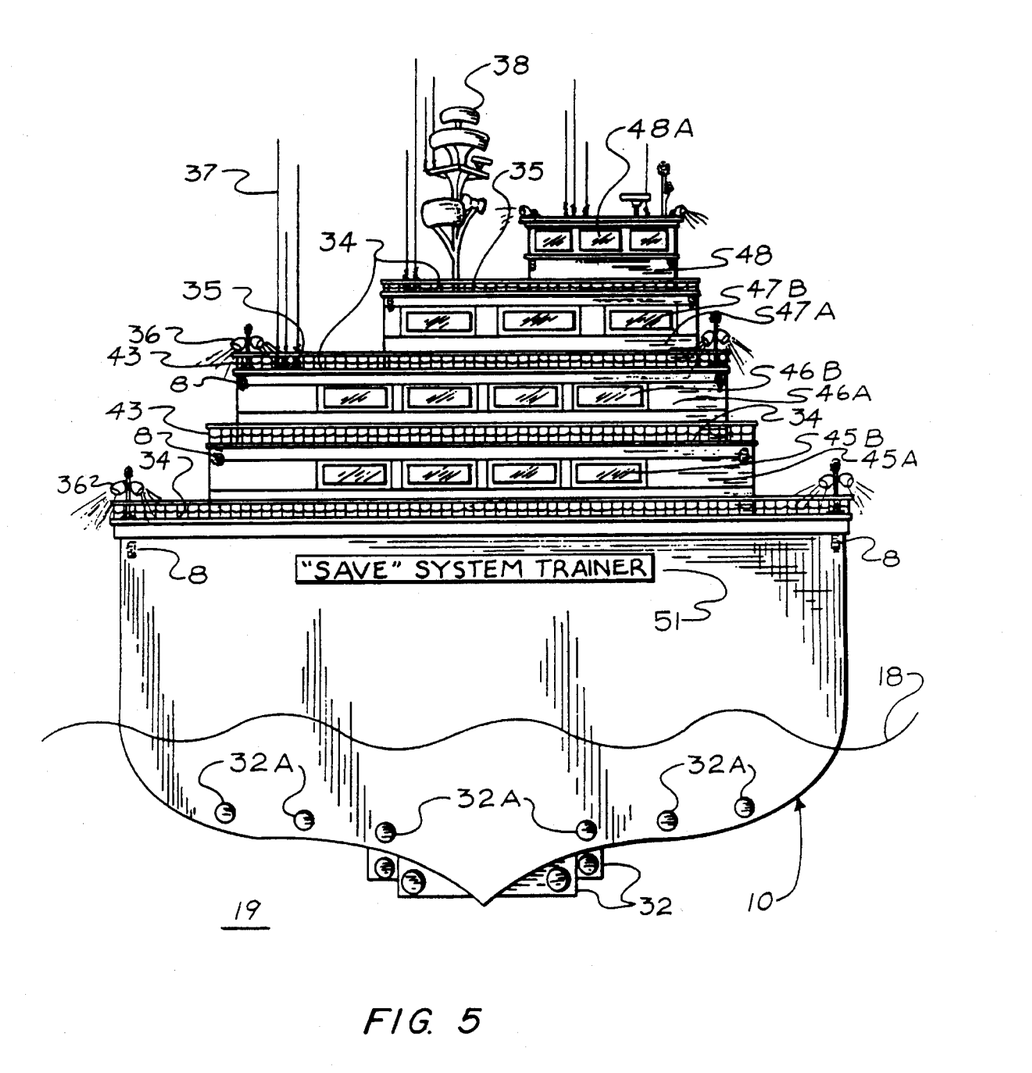
FIG. 5 is a bow elevation of the first embodiment shown in FIG. 1.

FIG. 5 shows the bow elevation of embodiment 10 which resembles that of the bow of a contoured flat bottom barge. Positioned below water line 18 are strategically positioned both internally 32A and externally 32 turbo water jets. Each water jet has the ability to be computer controlled for joint training operations or independently controlled for specific pitch and roll simulations and desired weather conditions. Additionally, turbo-powered water jets 32 positioned horizontally under and around the exterior hull surface allow for forward and backward (reverse) movement for increased pitch and roll simulation with the added realism of forward and reverse transport movement.

For identification purposes when deployed on training exercise and missions, the "SAVE" SYSTEM TRAINER name plate has been affixed to center bow embodiment 10. All additional features above and below housing 10 are as already described and are not mentioned further here.

Figure 6:
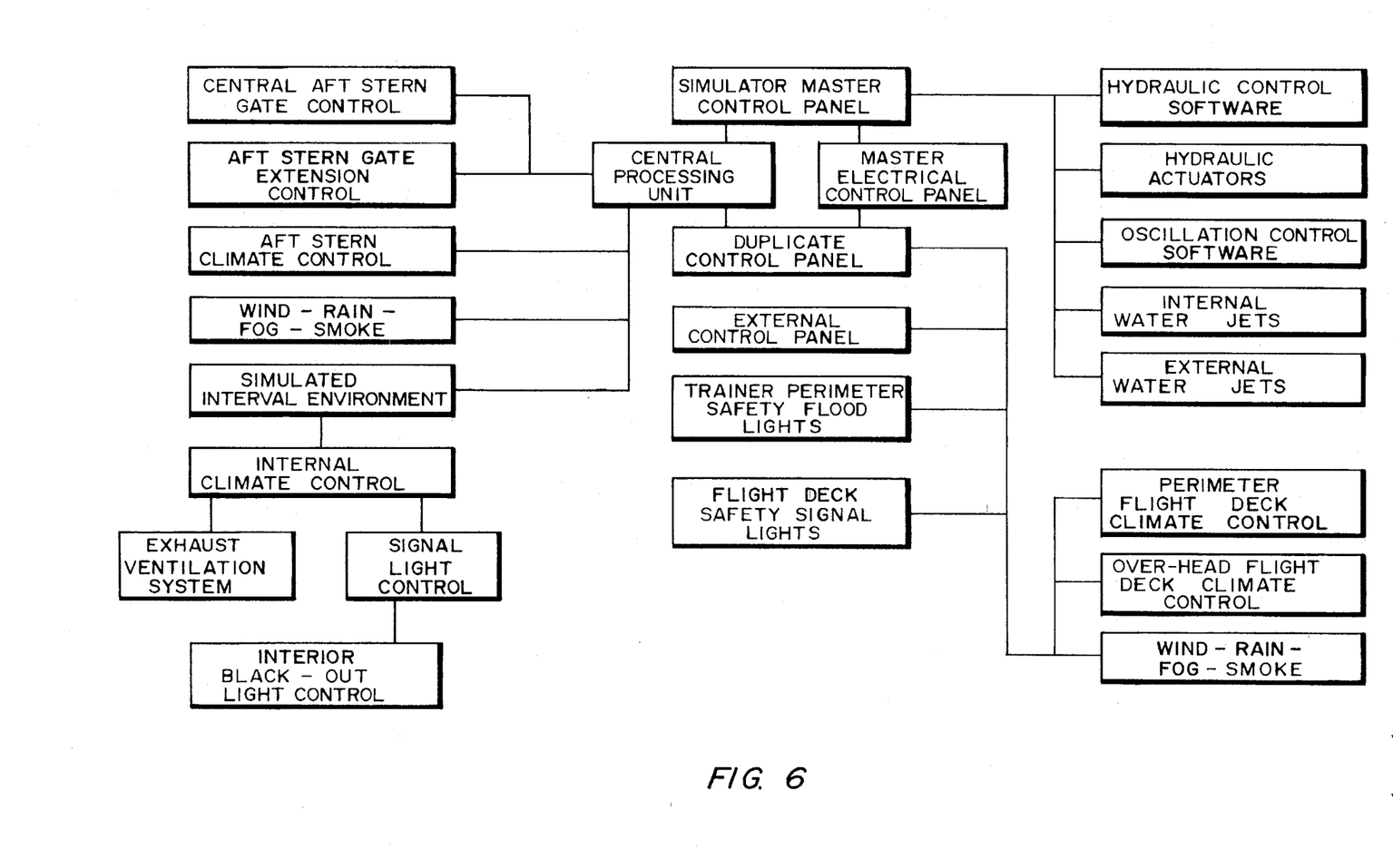
FIG. 6 is a schematic or block diagram of simulation and Joint Operations controls.
Figure 7:
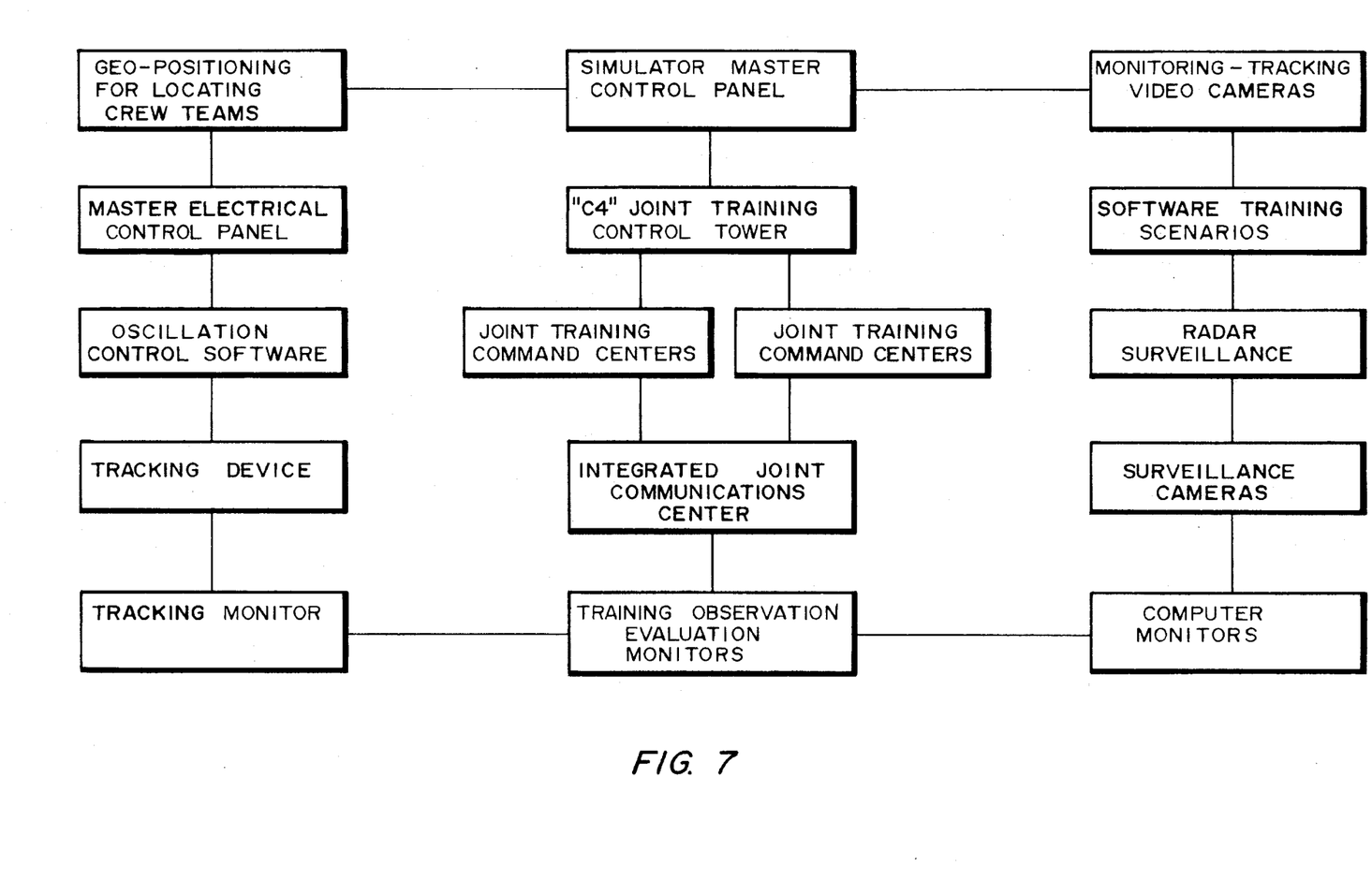
FIG. 7 is a schematic or block diagram showing the interrelationship of command centers with integrated training functions.

FIG. 6 shows in block form a schematic or block diagram of simulation controls, communications, and computer means. A central processing unit (CPU) appears in the center, with master control panel to the right and duplicate control panel at the left. Their respective locations are matters of choice, but the CPU may be most conveniently located in the "C4" Command & Control Tower 48 with matching panels in Command and Control Centers 46 and 47. The master control panel has camera and tracking controls as part of a tracking monitor, and extensive geo-positioning linkage, as well as integrated monitors for air, land, sea computerized training operations. Additionally, the master control panel controls the simulated environmental, including not only such climate functions as heating, ventilation, and air-conditioning but also simulated both internal and external aural, visual, and tactile environmental cues. The tactile cues require a variety of computerized controlled programs and software which moves the housing 10 in pitch and roll to simulate whatever type of seagoing environment is desired. External environmental devices and apparatus control wind 12, rain 9, and fog 6, water jets and wave-generation equipment. Programs for desired training scenarios are contained in appropriate "C4" Command and Control Centers storage banks.

Preferred embodiments and variants have been suggested for this invention, and at least some of their benefits and advantages noted. Other modifications may be made, as by adding, combining, deleting, or subdividing compositions, parts, or steps, while retaining all or some of the advantages and benefits of the present invention-which itself is defined in the following claims.

I claim:

1. Simulated amphibious vehicular environment (SAVE) trainer, providing storage and transport facilities for crews and small craft launchable therefrom and recoverable thereby, comprising     a waterborne training vessel simulating in part a hull portion of a seagoing transport for small craft, and and including simulator means     fluid jet means spaced on the hull at a plurality of positions oriented outward therefrom and actuatable by the simulate one to influence trainer orientation in azimuth, pitch, and roll; and closure means normally covering an entryway for amphibious craft into and out from an end portion of the trainer and deployable to enable launching and recovery of amphibious crews and vehicles.

2. SAVE trainer according to claim 1, including auxiliary power means adapted to operate the fluid jet means.

3. SAVE trainer according to claim 2, including communication means also operable from the auxiliary power means.

4. SAVE trainer according to claim 1, including cuing means adapted to provide to crews inside the trainer preselected aural, tactile, and optionally visual cues of a seagoing environment.

5. SAVE trainer according to claim 1, including deck means providing a takeoff and landing surface for aircraft.

6. SAVE trainer according to claim 2, including storage facilities for aircraft.

7. Simulated amphibious vehicular environment (SAVE) trainer, providing storage and transport facilities for crews and small craft launchable therefrom and recoverable thereby, comprising a training vessel adapted for over-the-horizon use simulating a hull portion of a seagoing transport for small craft, and including simulator means adapted to actuate crew training and crew environmental exposure;

a plurality of jets, actuatable by the simulator means, at locations spaced apart on the exterior surface of the vessel and variously oriented outward; and storage facilities plus launching and recovery means for both aircraft and sea craft.

8. SAVE trainer according to claim 7, including closure means normally covering an entryway for amphibious craft into and out from an end portion of the trainer and deployable to enable launching and recovery of amphibious crews and vehicles.

9. SAVE trainer according to claim 7, including deck means providing a takeoff and landing surface for aircraft.

10. SAVE trainer according to claim 7, including fluid means for simulating natural meteorological visibility impairment.

11. SAVE trainer according to claim 7, wherein the fluid jets are adapted to control vessel orientation in azimuth, pitch, and roll; and including training means providing aural, tactile, and visual cues of a preselected seagoing environment to the crew while limiting crew perception of the actual external environment.

12. Simulation-assisted system for training air or amphibious crews for craft launching, maneuvering, and recovery, comprising simulation means to actuate the following for training purposes, in a simulated transport vessel actually waterborne over the horizon from land and attending vessels;

(a) fluid jet means variously located on the hull and actuated for controlling the orientation of the waterborne simulated transport vessel in azimuth, pitch, and roll, as a simulation trainer for crews of aircraft and of amphibious craft; and (b) environmental means effectively limiting crew perception of the external environment and providing aural, tactile, and visual cues of selected simulated seagoing environments to the crews.

13. System according to claim 12, including amphibious craft and aircraft plus facilities for instructing crews, while subjected to cues consistent with a seagoing environment, in procedures of launching, maneuvering, landing, and recovery of such craft.

14. System according to claim 12, wherein some of the amphibious craft are adapted to float in water, and other of the amphibious craft are adapted to hover above the water.

15. System according to claim 12, including as crew training aids display means simulating navigation data and position before craft launching, maneuvering, or recovery, and monitoring means adapted to oversee craft launching, maneuvering, and recovery, plus review means adapted to summarize the monitored activities.

* * * * *